United States Patent [19]

Curley et al.

[11] 4,093,034
[45] June 6, 1978

[54] VEHICLE SUPPORTED WINCH

[75] Inventors: Francis M. Curley, Metamora; James L. Schmitt, Washington, both of Ill.

[73] Assignee: Caterpillar Tractor Co., Peoria, Ill.

[21] Appl. No.: 640,515

[22] Filed: Dec. 15, 1975

[51] Int. Cl.$^2$ ............................................. B60K 17/28
[52] U.S. Cl. .................................... 180/53 R; 180/52; 184/7 R; 254/166; 254/187.4
[58] Field of Search ................ 180/53 R, 53 C, 53 D; 254/150 R, 150 FH, 166, 187 R, 187 G, 187 H; 184/7 R

[56] References Cited

U.S. PATENT DOCUMENTS

| | | | |
|---|---|---|---|
| 3,107,899 | 10/1963 | Henneman | 254/187 H |
| 3,268,211 | 8/1966 | Schlechter | 254/187 H |
| 3,296,893 | 1/1967 | Shaffer | 254/187 H |
| 3,300,190 | 1/1967 | Blase | 254/187 H |
| 3,463,278 | 8/1969 | Broeker | 254/187 H |
| 3,550,735 | 12/1970 | Olsen | 254/187 H X |
| 3,773,129 | 11/1973 | Anderson | 180/14 B |
| 3,841,608 | 10/1974 | Schmitt | 254/187 R |
| 3,853,303 | 12/1974 | Wineburner | 254/187 H X |
| 3,913,697 | 10/1975 | Greene | 180/14 A |

Primary Examiner—John P. Silverstrim

Attorney, Agent, or Firm—Phillips, Moore, Weissenberger, Lempio & Majestic

[57] ABSTRACT

The invention is concerned with improvement in a vehicle supported winch which comprises a supported rotatable drum for receiving and releasing a cable, a drive train for selectively transmitting rotary motion to said drum having clutching apparatus and breaking apparatus, a pump serving as a source of pressurized fluid and valves communicating the pump for selectively controlling application of the pressurized fluid to the clutch apparatus and the brake apparatus. The improvement comprises an accumulator communicating with the pump for storing the pressurized fluid produced by the pump when it functions and for supplying the pressurized fluid when function of the pump is retarded. A transmission is driven by an engine of the vehicle and drivingly connected to drive the drive train to selectively transmit rotary motion to the drum. A pump drive apparatus drivingly connects the pump to be driven by the transmission of the vehicle. Functioning of the pump is retarded as the transmission stalls. When functioning of the transmission is retarded the accumulator supplies the necessary pressurized fluid.

3 Claims, 9 Drawing Figures

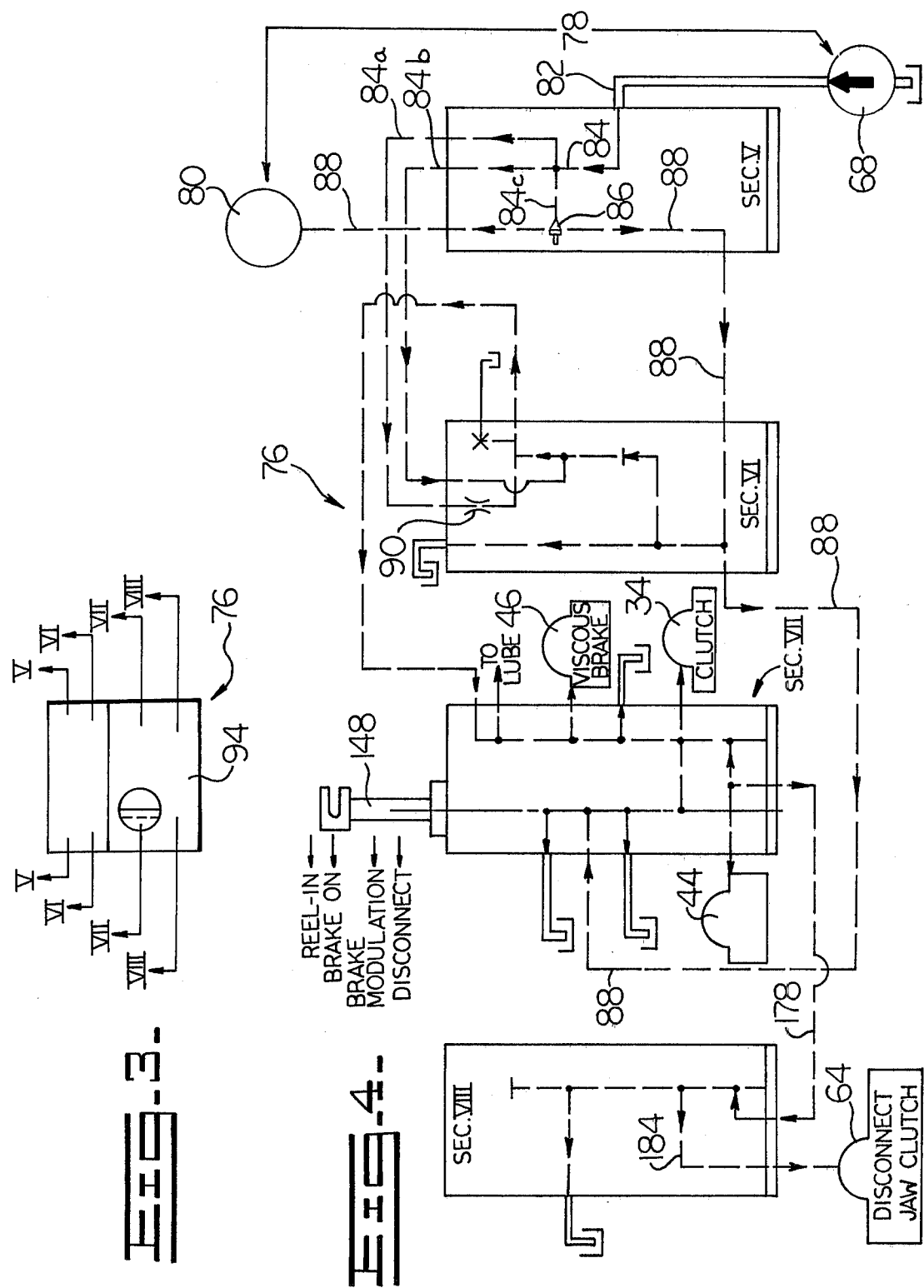

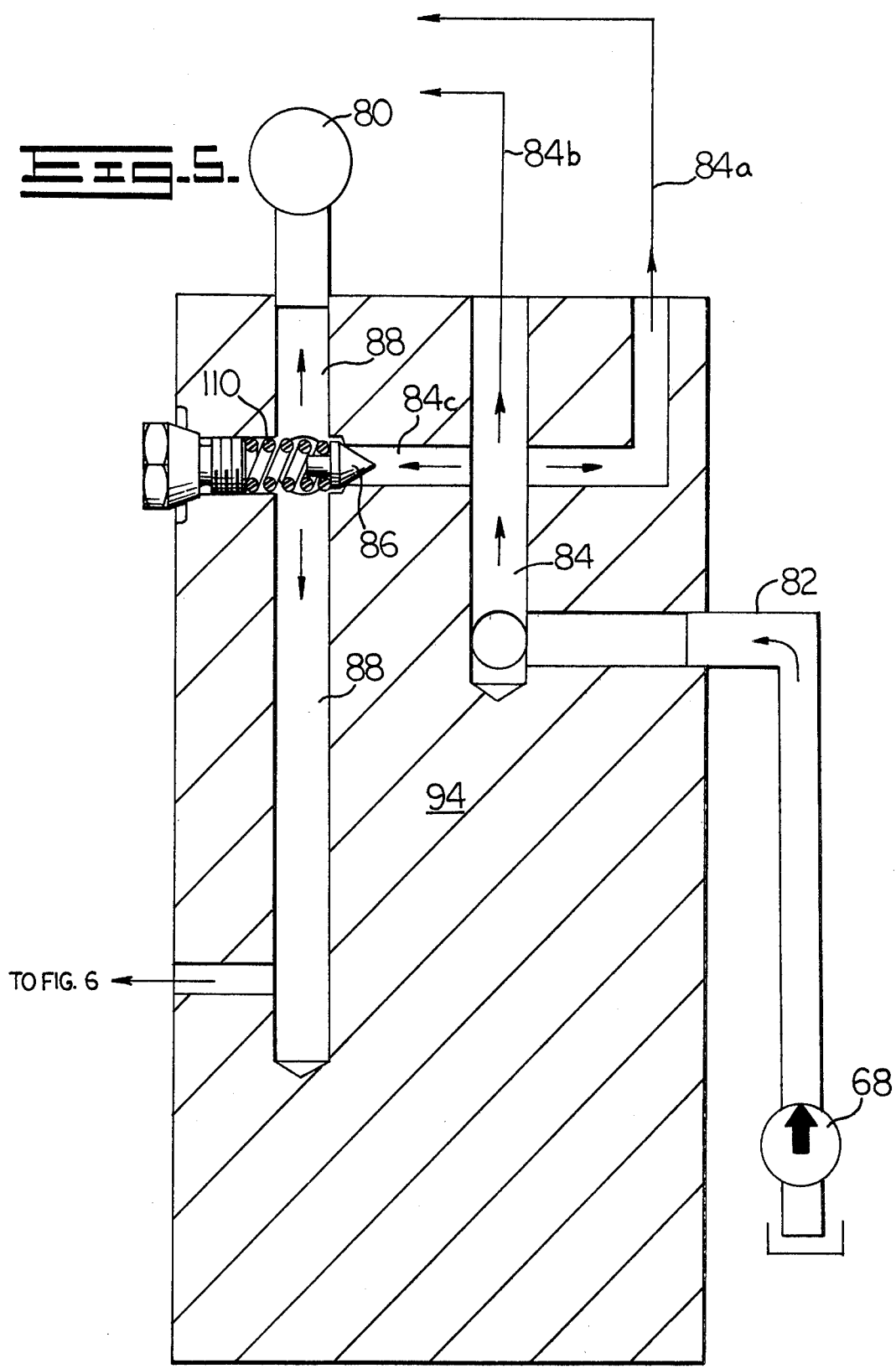

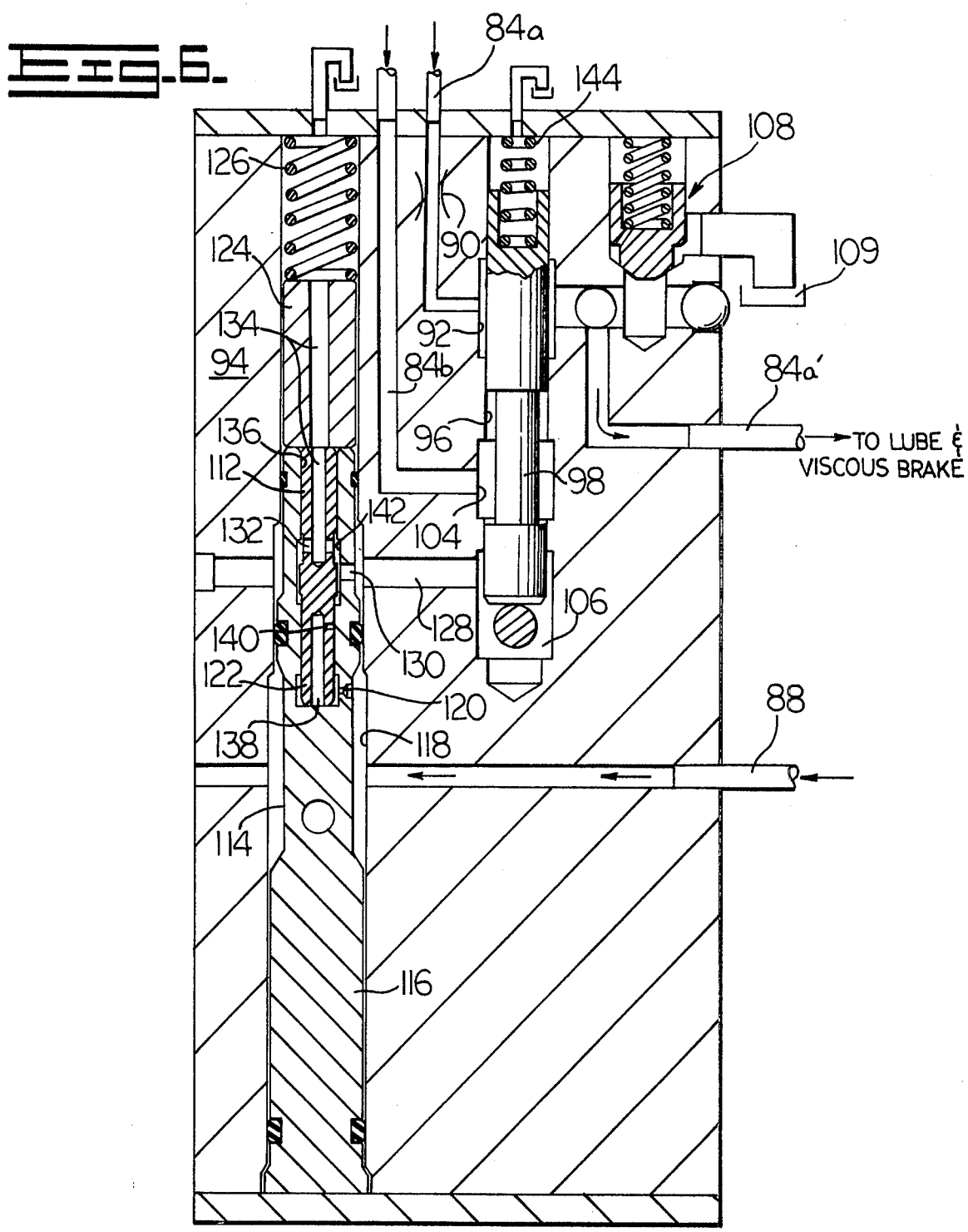

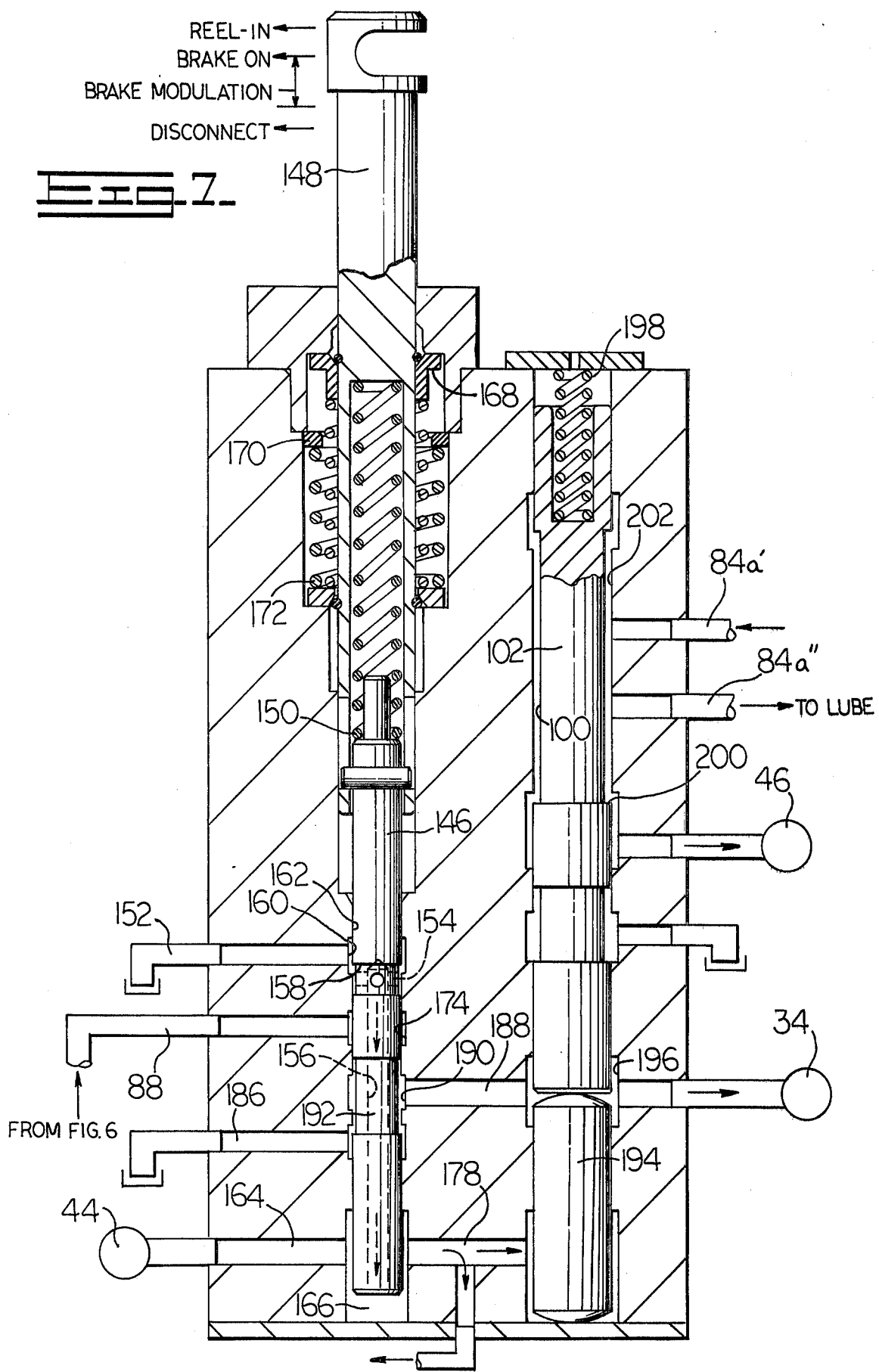

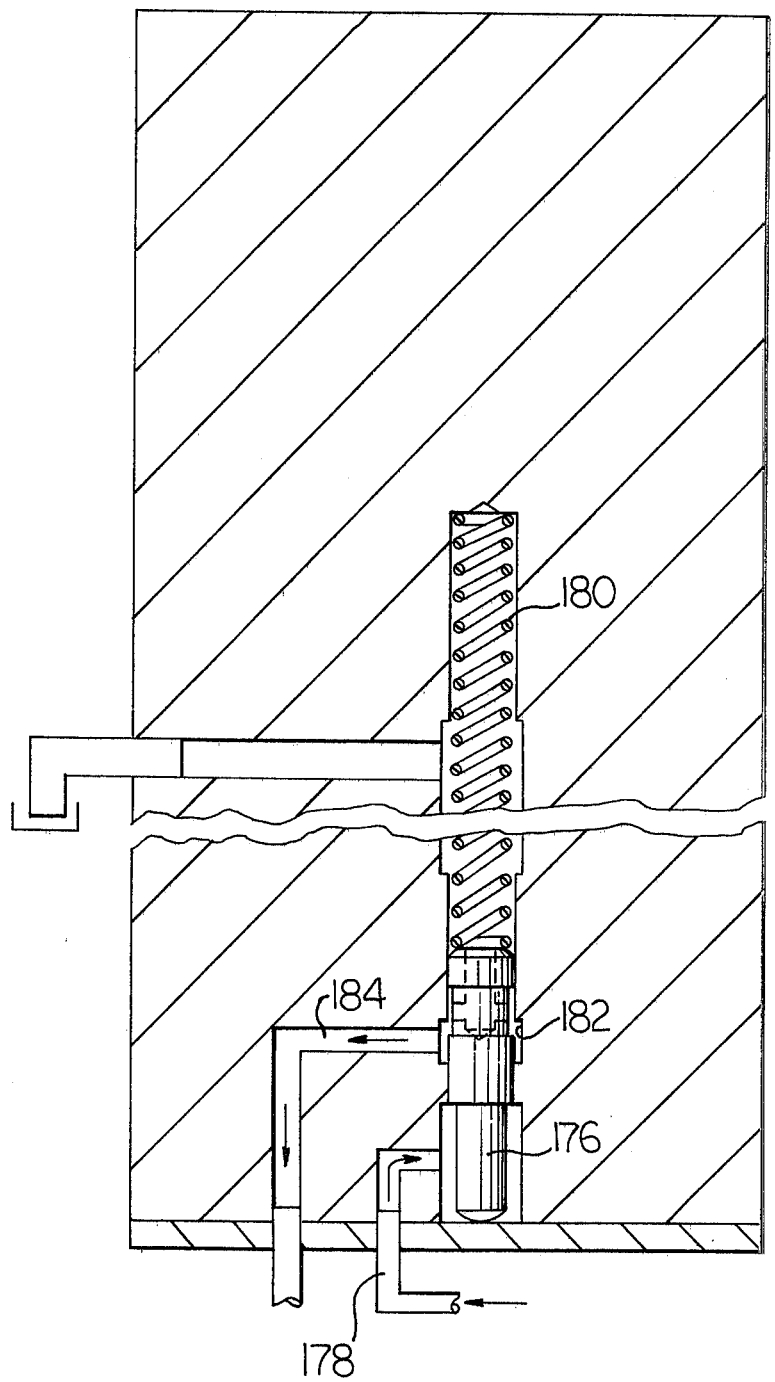

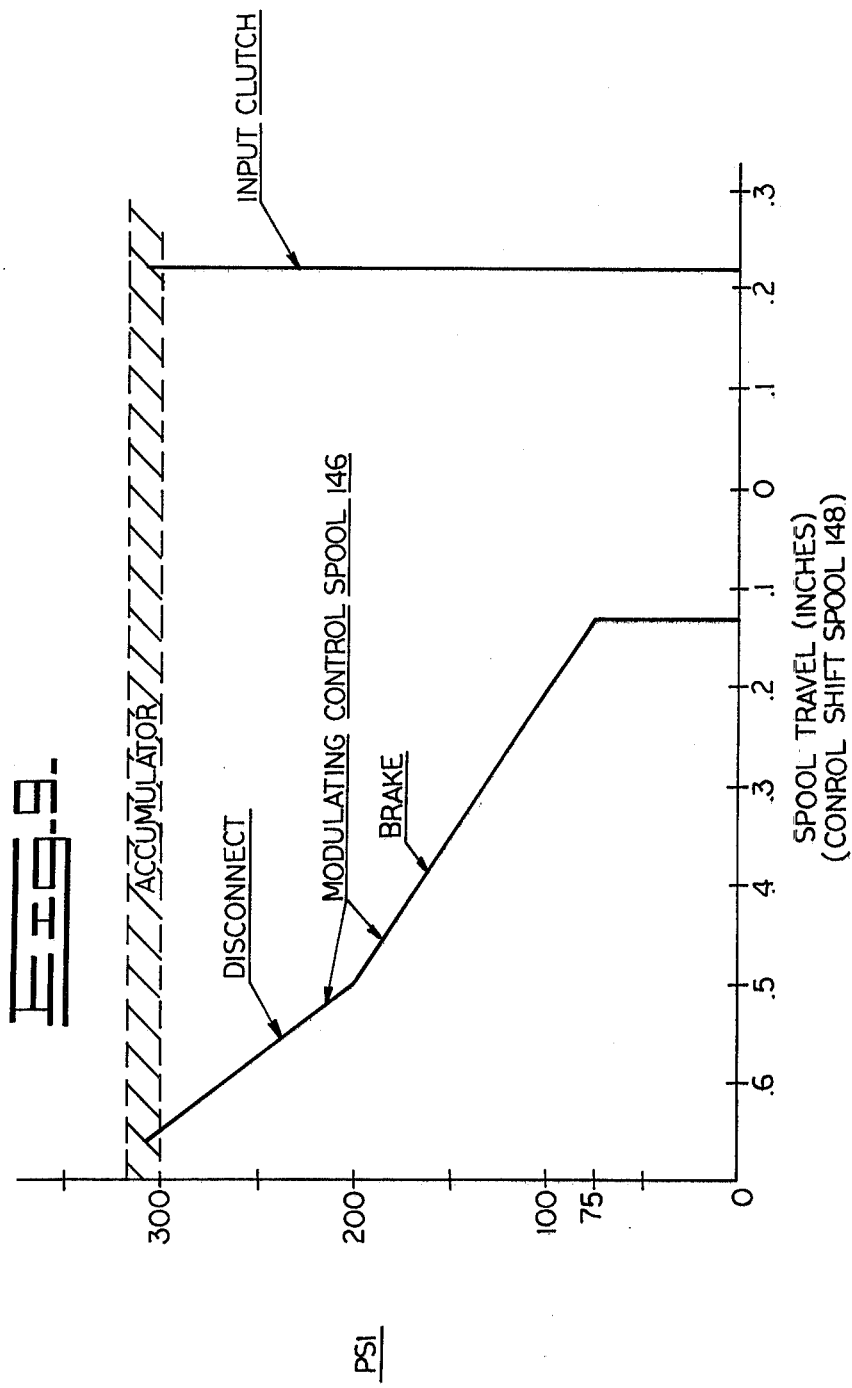

VEHICLE SUPPORTED WINCH

BACKGROUND OF THE INVENTION

Field of the Invention

The invention is concerned with winches having a powered rotatable drum for winding in and releasing a cable or the like and more particularly to a winch system of the type in which the drum is driven and controlled by means of fluid pressure-operated clutches and brakes.

Prior application Ser. No. 334,354 of L. F. Yates et al., filed Feb. 21, 1973 for "WINCH WITH FREE-WHEELING DRUM" assigned to the assignee of the present application and referred to in U.S. Pat. No. 3,841,608, discloses a winch assembly which is driven by an engine through a drive train having a normally disengaged input clutch which engages in response to fluid pressure to reel in cable. The drive train also includes a normally engaged brake for immobilizing the winch drum but which releases in response to fluid pressure in other modes of operation. In addition to the Brake-On and Reel-In modes of operation, the brake alone may be pressurized to effect a Brake-Off mode in which load forces pulling on the line may unwind cable against the limited resistance created by the drag of the drive train components. This limited resistance prevents excess unwinding of cable by a load, from drum momentum or other causes, but is sufficiently strong that it is difficult or impossible to withdraw cable manually while such resistance is present. Accordingly, the drive train connects to the winch drum itself through a disconnect clutch which is normally engaged but which may be disengaged by fluid pressure to allow manual reeling of cable from the drum without working against a substantial resistance. This form of winch assembly is highly useful on a log skidder vehicle, for example, which is used to drag logs from the site of a lumbering operation and also has substantial advantages in other contexts.

Prior U.S. Pat. No. 3,841,608 discloses a hydraulic control system for a winch assembly of this kind in which a manually operated control valve may be shifted between a series of positions to pressurize and depressurize appropriate ones of the clutches and brake of the drive train in order to accomplish the several operational modes described above. The valve settings include Reel-In, Brake-On, Brake-Off and Free-spool and are realized by movement of a control lever or the like. For safety reasons as well as for convenience of operation, centering springs urge the control valve towards the Brake-On position so that if the operator releases his control lever or the like, the winch is automatically immobilized.

The operator of these winch systems must pay careful attention to the position of his control lever or the like in order to control movement of a load in a safe and efficient manner. It is particularly important to avoid movement of the lever into the Disconnect position through misjudgment while a load is pulling on the cable since momentum and overtravel may cause an excessive amount of cable to be released, creating unwanted slack, when dropping of the load stops or slows. Diversion of the operator's visual attention in order to guard against this occurrence is undesirable in many cases, particularly in such usages as on a log skidder where the operator must pay attention to controlling the vehicle itself in addition to operating the winch.

In order to guard against inadvertent movement of the control lever into the Free-spool position, the lever has usually been constrained to pivot along a slot in a console which includes an angled section whereby sideward movement is needed before the lever movement can be continued into the Free-spool position from the adjusted position. This arrangement accomplishes the objective of alerting the operator when the lever approaches the Free-spool position but it also undesirably complicates lever manipulation and delays shifting into the Free-spool mode at a time when fast action may be required.

Prior copending application Ser. No. 574,807 of Edward E. Flesburg, filed May 5, 1975 for "Winch and Fluid Control System Therefor" and assigned to the assignee of the present application discloses a winch system having a plurality of modes of operation, including a Free-spool mode in which there is little resistance to turning of the winch drum, which are initiated by movement of a single control lever. Means are provided which enable the operator to determine when the control lever is approaching the Free-spool position without necessarily relying on visual observation for this purpose and without complicating the lever movement pattern.

Generally, prior art vehicles supporting winches have had a pump driven by an engine shaft with the pump being positioned adjacent the engine. Thus, the pump has been on the tractor side of an articulation joint when the vehicle is articulated. The winch, on the other hand, has been on the trailer side of the articulated joint. This has required the provision of hydraulic lines which cross the articulated joint. The pressurized fluid from these hydraulic lines has been used to drive a hydraulic motor or the like which drive an input shaft of means for selectably transmitting rotary motion to the winch. The pressurized fluid is generally also used to activate various clutches and brakes of the means for selectively transmitting rotary motion to the winch. Passing hydraulic lines across an articulated joint, however, creates very serious construction and operation problems. Accordingly, the present invention provides a vehicle supported winch wherein the source of pressurized fluid which operates the clutches and the brakes of the winch system comprises pump means on the trailer side of the articulation driven by the transmission of the vehicle rather than by the engine and wherein the coupling to the transmission and the pump are generally on the trailer side of the articulation and via a single shaft thus eliminating hydraulic line coupling problems from the input shaft to the rotary motion transmitting means and from the pump shaft to the pump both proceeding from the tractor. The use of transmission driving for the pump means, however, introduces another problem, namely, that the transmission can slow down and stall as it is subjected to heavy loads even though the engine continues to turn. This is especially true with fluid transmissions. To solve this problem it has been found necessary to use in combination with the pump means driven by the transmission an accumulator for storing fluid pressure produced by the pump means when it functions and for supplying fluid pressure when functioning of the pump means is retarded. Thus, the advantages of driving the pump means by the transmission can be realized without the disadvantages which would be inherent therein without the use of an accumulator.

SUMMARY OF THE INVENTION

The invention is concerned with an improvement in a vehicle supported winch which comprises a supported rotatable drum for receiving and releasing a cable, means for selectively transmitting rotary motion to said drum having clutch means and brake means, pump means serving as a source of pressurized fluid and means communicating said pump for selectively controlling application of said pressurized fluid to said clutch means and brake means. The improvement of the present invention comprises an accumulator communicating with the pump means for storing the pressurized fluid produced by the pump means when it functions and for supplying the pressurized fluid when functioning of the pump means is retarded. A transmission is driven by an engine of the vehicle and drivingly connected to drive the means for selectively transmitting rotary motion to the drum. Further, drive means serve to drivingly connect the pump means to be driven by the transmission of the vehicle. Functioning of the pump means is retarded as the transmission stalls. In this situation, the accumulator provides the necessary pressurized fluid.

BRIEF DESCRIPTION OF THE DRAWINGS

The invention will be better understood by reference to the figures of the drawings wherein like numbers denote like parts throughout and wherein:

FIG. 3 illustrates schematically the construction of the control system for the winch of the present invention;

FIG. 4 illustrates schematically the operation of the parts of the control system illustrated in FIG. 3;

FIG. 5 comprises a detailed schematic representation corresponding to a view along lines V—V of FIG. 3;

FIG. 6 comprises a similar representation to that in FIG. 5 but taken along the line VI—VI of FIG. 3;

FIG. 7 illustrates a similar representation to those of FIGS. 5 and 6 but taken along the line corresponding to VII—VII of FIG. 3;

FIG. 8 illustrates a similar representation as those shown in FIGS. 6, 7 and 8 but taken along the line represented by VIII—VIII of FIG. 3; and FIG. 9 comprises a graph illustrating the operation of the winch of the present invention in its various operational positions.

DETAILED DESCRIPTION OF THE PREFERRED EMBODIMENT

Figure 1:
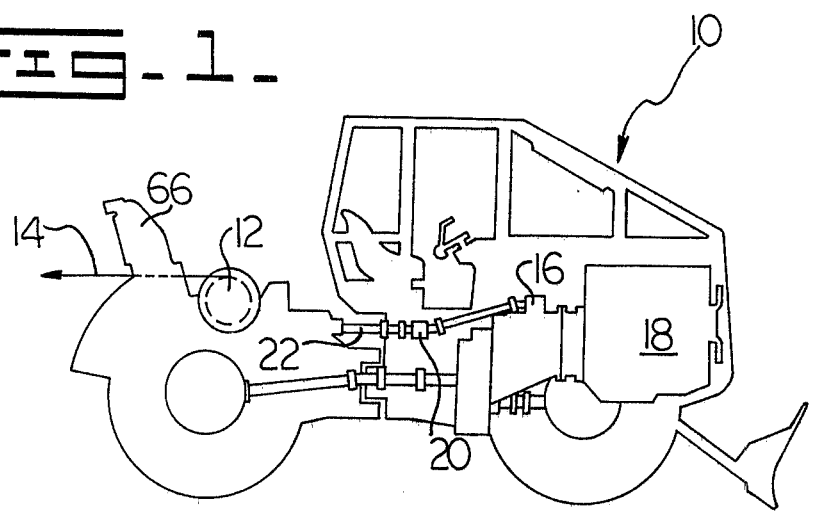
FIG. 1 illustrates an articulated vehicle including a winch in accordance with the present invention.

The winch system of the present invention was initially developed for use on an articulated vehicle, including a winch on the back thereof and is therefore described in that particular context for purposes of example, it being apparent that the apparatus may also be employed on various other forms of load-manipulating equipment. Referring initially to FIG. 1, an articulated vehicle 10, which may be used in lumbering operations or the like primarily for dragging heavy logs away from the site of tree-cutting operations, is illustrated. For this purpose, the vehicle is provided with a rotatable winch drum 12 having a length of cable 14 wound thereon.

As is understood by those skilled in the art, it is necessary at times to immobilize the winch drum 12 so that the vehicle may be used to drag a log while at other times the cable 14 must be reeled in by driving the drum. In the embodiment of the present invention, the drum 12 is driven by a transmission 16 which is itself driven in the usual manner by an engine 18 of the vehicle 10. Generally, the transmission 16 drives the winch drum 12 via a universal joint 20 from which extends an input shaft 22.

As is further understood by those skilled in the art, there are times when it is necessary to release some of the cable 14 from the winch drum 12. If the cable is to be withdrawn from the drum by the weight of the load pulling on the cable, it is desirable that there be some limited resistance to drum rotation. Such resistance prevents overly fast or erratic release of cable and prevents momentum from causing an excess amount of cable to be released when load movement slows or stops.

Figure 2:
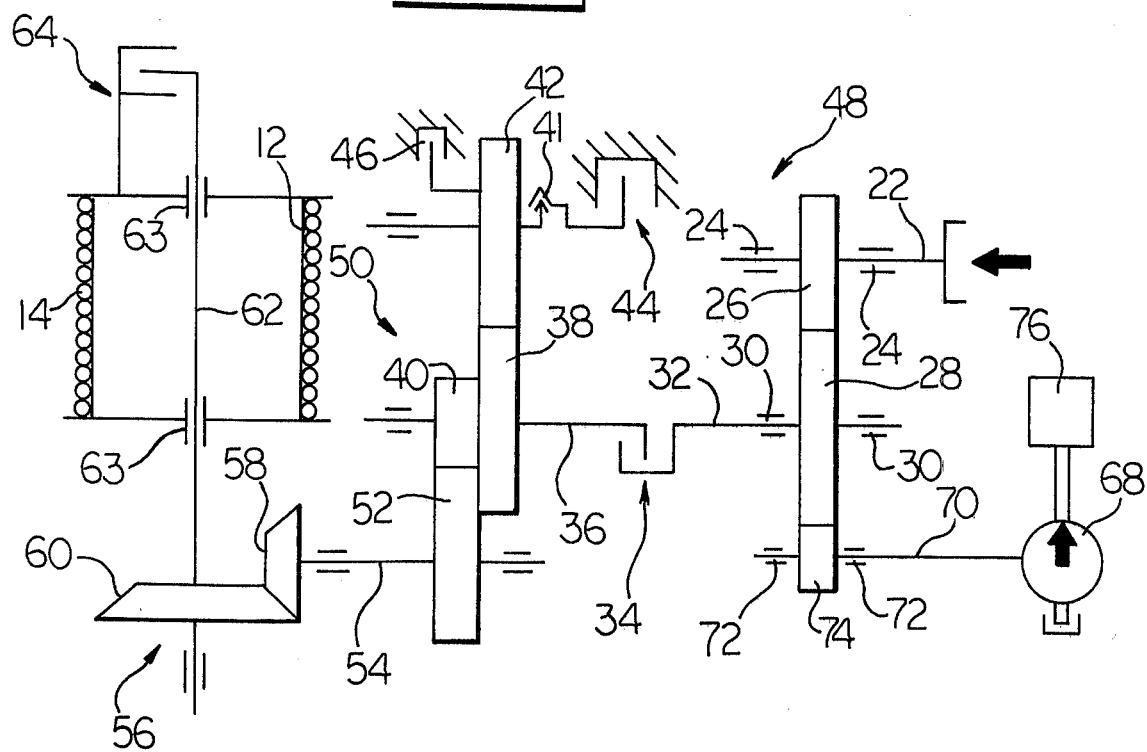
FIG. 2 illustrates a winch, the clutches and brakes therefor, and means for selectively transmitting rotary motion to the drum thereof along with means for driving a pump therefrom in schematic representation.

Referring now to FIG. 2 of the drawing primarily, there is illustrated therein means for selectively transmitting rotary motion to the winch drum 12 from the transmission 16. Specifically, the input shaft 22 from the transmission 16 guided by the bearings 24 causes a first gear 26 to rotate. The first gear 26 is drivingly connected to a second gear 28 supported by bearing means 30. As the second gear 28 rotates under the impetus of the first gear 26, this causes a first shaft 32 to rotate a normally disengaged friction input clutch 34. On application of fluid pressure to the input clutch 34, it drivingly engages with a second shaft 36. The second shaft 36 from the clutch 34 is coupled with a clutch output gear 38, which is secured for rotation with a transfer gear 40. The clutch output gear 38 meshes with a brake gear 42 while a normally engaged friction brake 44 is operable to secure the brake gear 42 against rotation. A conventional one-way sprag clutch 41 allows the drum to be rotated to wind in cable 14 without releasing brake 44. A normally disengaged viscous brake 46, which engages on application of fluid pressure thereto, is provided, which acts upon the brake gear 42 to provide a viscous drag in the Brake-on position, thus preventing continued winding of the cable 14 about the winch drum 12, when the brake 44 is engaged.

The components described above in engagement with the input shaft 22 comprise an intermediate portion of the drive train. The normally disengaged input clutch 34 permits driving operation of the gear components within the intermediate drive train by the input shaft 22. The normally engaged brake 44 in one mode of operation tends to be disengaged as the clutch 34 is engaged or conversely, tends to be engaged as the clutch 34 is disengaged. Thus, the brake 44 serves to prevent rotation of the intermediate drive train for at least those components on the output side of the clutch 34 when it is disengaged. In this connection, the hydraulic control system described below is adapted to selectively operate the brake 44 and the clutch 34 in opposition with each other or to operate the brake 44 alone, the control system having hydraulic control valve means with modulating means particularly adapted for operation of the brake 44 and the clutch 34.

An output portion 50 of the winch drive train includes a second transfer gear 52 arranged in meshing engagement with the first transfer gear 40. The second transfer gear 52 is mounted upon a third shaft 54 for a bevel gear assembly 56 having bevel gears 58 and 60. A winch drum shaft 62 provides an output for the bevel gear assembly 56 with the winch drum 12 being arranged for rotation upon the shaft 62 by means of bearings 63.

A jaw-type disconnect clutch 64 is normally engaged to provide a coupling between the winch drum shaft 62 and the winch drum 12 while being selectively disengageable to permit freewheeling of the winch drum 12. Referring momentarily to FIG. 1, it may be seen that the cable 14 is entrained about the winch drum 12 for operation in conjunction with an arch 66. The above discussed components and their interactions are described in more detail in previously mentioned application Ser. No. 574,807.

As will be further noted by reference to FIG. 2, pump means, in particular a hydraulic pump 68, is driven by the intermediate portion 48 of the winch drive train. More particularly, the pump 68 is driven by a pump shaft 70, which rotates in bearings 72 and is driven by a pump gear 74, which meshingly engages with the second gear 28. It is clear from the arrangement set out in FIG. 2 that the pump 68 is thus driven by the transmission 16 and is in fact directly driven thereby via the first gear 26, the second gear 28 and the pump gear 74. Further, it is clear that the hydraulic pump 68 is driven by the transmission 16 in a continuous manner and that such driving is not interrupted when the clutch 34 is disengaged, the brake 44 is applied or the clutch 64 is disengaged. It follows that the pump 68 will then only cease to pump hydraulic fluid if the transmission 16 stalls or if it is shut off in some manner not shown in FIG. 2.

Referring now to FIGS. 3-8, there is illustrated control valve means 76 generally in FIGS. 3 and 4 and by specific parts thereof in FIGS. 5-8. Also illustrated in FIGS. 4 and 5 is an improved pressurized fluid source 78 comprising the aforementioned hydraulic pump 68 driven by the transmission 16 and an accumulator 80 which communicates with the pump 68 via a conduit 82 a passage 84, a check valve 86 and an accumulator passage 88.

Operationally, the pump 68, driven by the transmission 16, supplies fluid via the conduit 82 to the passage 84. The passage 84 then separates into three branches, a first branch 84A leading off to a restrictive orifice 90 and thence being continuously routed to lubricate the vehicle supported winch. The path of continuous routing comprises a passage about an undercut 92 shown in FIG. 6 in a control body 94 and more particularly in a bore 96 within said control body 94 and in which a control spool 98 is movable in a way later explained. The flow from the undercut 92 proceeds via a continuation 84A' of passage 84A as shown in FIGS. 6 and 7 and thence about an undercut 100 in a viscuous brake spool 102 and finally via a further continuation 84A'' of passage 84A to lubricate the winch and then be returned to the pump 68.

A second portion of the fluid being pumped by the pump 68 leaves the passage 84 via a second branch thereof 84B. This is shown most clearly in FIG. 5. The passage 84B then takes the second portion of fluid from the pump 68 and delivers it as shown in FIG. 6 to an undercut 104 in the bore 96 of the control spool 98. In certain modes of operation, as will be explained in the following, the control spool 98 is shifted responsive to pressure being applied in a pressure cavity 106 thereof sufficiently so that the fluid from the pump being delivered via passage 84B proceeds from the undercut 104 to the undercut 92 and thence via the passage 84A' to lubricate the winch along with the first portion of fluid from the pump 68 which has passed through the orifice 90 and directly into the undercut 92. A pressure relief valve 108 controls the total amount of pressure which can be sent to lubricate the winch by providing an escape means to a sump 109 of the pump 68 when the pressure of the fluid in the passage 84A' exceeds a selected value, for example 50 psi or the like.

The passage 84 divides into a third branch 84C as illustrated in FIG. 5 and there impinges upon the check valve 86. The check valve 86 allows passage therepast only when a sufficient pressure differential exists in the passage 84C and the fluid in the accumulator 80 so as to move the check valve 86 against the action of a spring 110.

A logic slug 112 shown in FIG. 6 controls the operation of the control spool 98 in a way which will soon be apparent. As will be noted, the accumulator passage 88, which is maintained at pressure by the accumulator 80, communicates with a narrowed portion 114 of a sleeve 116 which is coaxial with the logic slug 112. The fluid pressure from the accumulator passage 88 is thus applied to the bore 118. From the bore 118 the pressure in the accumulator passage is also applied via a port 120 to a smaller diameter portion 122 of the logic slug 112. Because of the pressure being applied to the smaller diameter portion 122 of the logic slug 112, the logic slug 112 is forced against a spacer 124 and thereby against a spring 126. As the logic slug 112 moves towards the spring 126 and compresses it, a pressure cavity passage 128, which proceeds between the pressure cavity 106 and the bore 118, is cut off from draining via an opening 130, a cross bore 132 and a logic spool and a spacer bore 134. As this cut off in draining of the pressure cavity passage 128 occurs, or shortly thereafter, the pressure in the accumulator 80, which is exactly the same as pressure within the accumulator passage 88, is applied to a larger diameter portion 136 of the logic spool 112. This occurs since the pressurized fluid in the accumulator passage 88 passes first through the port 120, then up a bore 138 and through a hole 140 to an undercut 142 and thence is applied against the larger diameter portion 136 of the logic slug 112. The accumulator pressure or more specifically, the pressure within the accumulator passage 88 is likewise applied at the same time via the port 120, the bore 138, the hole 140, the opening 130 and the pressure cavity passage 128 to the pressure cavity 106 of the control spool 98. Two things result as a consequence of the application of the fluid pressure in the accumulator passage 88 to the undercut 142. First, the logic slug 112 is urged quickly against the force exerted by the spring 126. Second, the pressure cavity 106 begins to fill, thus forcing the control spool 98 against the retaining force of a spring 144. This continues until sufficient pressure exists in the pressure cavity 106 to connect the undercut 92 with the undercut 104, whereby flow of fluid from the pump 68 via the passageway 84B' occurs to lubricate the winch as previously described. Because of this relief means for the pressure produced by the pump 68, said pump can operate continuously and does not have to be shut off once the accumulator has been charged to its full operating pressure. As pressure drops in the accumulator 80 and hence in the accumulator passage 88, the logic slug 112 is propelled by the spring 126 until the pressure cavity 106 is open to drain as previously described. At that time, pump flow from the pump 68 is once again routed to the accumulator 80 via the check valve 86 and the cycle just described begins anew.

The accumulator pressure is also applied to a modulating control spool 146, illustrated most clearly in FIG. 7. The pressure is applied via the accumulator passage 88 and the bore 118 about the sleeve 116. The direction of application of the pressure in the accumulator passage 88 is controlled by movement of a control shift spool 148, which can be manually adjusted towards and away from the modulating control spool 146, and which communicates with the modulating control spool 146 via a modulating spring 150. As the control shift spool 148 is moved towards the modulating control spool 146, this forces the modulating control spool 146 via the spring 150 downwardly in FIG. 7. Eventually, the modulating control spool 146 closes off the connection between a brake drain passage 152 and the brake 44, which normally proceeds via a cross bore 154 and an axial bore 156 of the modulating control spool 146. Very simply, a shoulder 158 of the modulating control spool 146 shuts off contact between an undercut 160 within a bore 162 of the modulating control spool 146 and the cross bore 154 leading to the axial bore 156 of the modulating control spool 146. The brake 44, as will be noted, normally drains via a brake passage 164 to a lower cavity 166 of the bore 162. Pressure on the brake 44 will modulate between a lower and an upper limit, for example, between 75 and 200 psi depending on the distance that the control shift spool 148 is moved downwardly. After moving a specific distance downwardly, the control shift spool 148, or more particularly, a flange 168 extending radially therefrom, contact a washer 170 and thus meets the resistance of a heavy spring 172. An operator moving the control shift spool 148 can immediately feel the change in resistance to movement of the control shift spool 148. The control shift spool 148 is at the time of contact of the flange 168 with the washer 170 in its maximum modulating position for the Brake-Off position at which only the brake 44 is pressurized. In this situation, the brake 44 is pressurized via the pressure in the accumulator passage 88, which passes first to an undercut 174 and thence via the cross bore 154 and the axial bore 156 to the brake 44. The brake 44 being normally engaged thus starts to become disengaged as pressure is applied thereto and it is prevented from draining via brake drain passage 152. The control shift spool 148 can then be moved an additional space downwardly, allowing pressure to build within the brake 44 fully to the pressure within the accumulator passage 88. This pressure is likewise applied to a disconnect spool 176 via a disconnect passage 178 (FIG. 8). This pressure causes the disconnect spool 176 to move against the biasing of a spring 180 until eventually flow connection is completed with an undercut 182 leading to pressurization of the disconnect clutch 64 via a passage 184. When the control shift spool 148 is released, the springs acting on the various spools force them back to their original positions and the disconnect clutch 64, as well as the friction brake 44, connect to drain.

It will be further noted that as the control shift spool 148 moves upwardly, the modulating control 146 will eventually close a Reel-In drain passage 186, and thereafter will open a Reel-In passage 188 to the accumulator passage 88 via the undercut 174, and an undercut 190 in the bore 162, and further via a modulating spool undercut 192 in the modulating control spool 146. This thus leads to pressurization of the Reel-In clutch, i.e., the input clutch 34. There is no modulation obtained in this operation. When the control shift spool 148 is released, the modulation control spool 146 is returned to its original position by the springs acting upon it and upon the control shift spool 148, thus allowing the Reel-In or input clutch 34 to drain.

The viscous brake 46 is operated off of pressure from the passage 84A'. As will be remembered, this passage also leads to lubrication of the winch. When the winch is working, i.e., reeling in, modulating brake pressure, or in disconnect mode, either a viscous brake slug 194 is pressurized via the disconnect passage 178, or a cavity 196 between the viscous brake slug 94 and the viscous brake spool 102 is pressurized via the reel-in passage 188. The presence of pressure at either of these places causes the viscous brake spool 102 to move upwardly against a spring 198 eventually closing off the viscous brake to pressure in passage 84A' when a shoulder 200 closes to a bore 202. Thus, the viscous brake 46 is off whenever the winch is operating.

It is clear then that what is provided is a Brake-On position at which the input clutch 34, the brake 44 and the disconnector clutch 64 are unpressurized, a Reel-In position at which only the input clutch 34 is pressurized, and a Brake-Off position at which only the brake 44 is pressurized. As is further clear, the inclusion of the accumulator 80 makes possible the functioning of the system when functioning of the pump 68 is retarded as, for example, when the transmission 16 of the vehicle stalls. The normally disengaged viscous drag brake 46 is engaged in the Brake-On position and disengaged in the Brake-Off, disconnect, and Reel-In positions.

FIG. 9 graphically illustrates the operation of modulating control spool 146 as a function of control shift spool 148 at various fluid pressures. Brake modulation, with shifting of control shift spool 148, is seen from spool travel of about 0.13 inch to about 0.5 inch.

While the invention has been described in connection with specific embodiments thereof, it will be understood that it is capable of further modification, and this application is intended to cover any variations, uses or adaptation of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. In a vehicle having an engine and a supported winch which comprises a supported rotatable drum for receiving and releasing a cable, means for selectively transmitting rotary motion to said drum having clutch and brake means, said clutch and brake means including a normally disengaged input clutch which drivingly engages on application of fluid pressure thereto, a normally engaged brake for stopping rotation of said transmitting means in a reel-out direction which releases on application of fluid pressure thereto, a normally engaged disconnect clutch which disengages said drum from said transmitting means on application of fluid pressure thereto and a normally disengage viscous drag brake which engages on application of fluid pressure thereto to create a drag on said drum opposing loosening of said cable, pump means serving as a source of pressurized fluid and means communicating said pump means for selectively controlling application of said pressurized fluid to said input clutch, said normally engaged brake, said disconnect clutch and said drag brake, an improvement comprising:

an accumulator communicating with said pump means for storing said pressurized fluid under pressure produced by said pump means when it functions and for supplying said pressurized fluid when functioning of said pump means is retarded;

a change speed transmission driven by said engine;

rotary means driven by said transmission for imparting rotary motion to said means for selectively transmitting rotary motion to said drum; and drive means driven by said rotary means, said drive means driving said pump, functioning of said pump being retarded as said transmission stalls whereby said accumulator supplies said pressurized fluid, said rotary means including a shaft extending from said transmission drivingly connected with said drive means; and control valve means providing selective application of fluid pressure to said input clutch, said brake, said disconnect clutch and said drag brake, said control valve means serving as said means for selectively controlling application of said pressurized fluid and comprising: a control body which includes means for continuously routing a first portion of said fluid to lubricate said winch and means for intermittently routing a second portion of said fluid away from said accumulator to lubricate said winch responsive to said accumulator fluid pressure reaching a preselected value, said body having (1) a fluid passage receiving fluid from said pump means, (2) a first branch passage as part of said continuous routing means and through which said first portion of said fluid flows via a restricted orifice, (3) a second branch passage in flow communication with a control spool which directs said second portion of said fluid to said intermittent routing means when accumulator pressure reaches said preselected value, (4) a third branch passage communicating via check valve means with said accumulator, (5) a logic slug receiving fluid pressure from said accumulator, delivering fluid pressure to move said control spool when said accumulator pressure reaches said preselected value into position for routing said second portion of said fluid to lubricate said whinch and providing path means for the fluid delivered to move said control spool when said accumulator pressure reaches said preselected value, and (6) a control shift spool operator positionable to a Reel-In position wherein said brake, input clutch, and disconnect clutch are engaged and said drage brake is disengaged, a Brake-On position in which said brake, disconnect clutch and drag brake are engaged and said input clutch is disengaged, a Brake-Off position in which only said disconnect clutch is engaged and a Free-Spool position in which said brake, said input clutch, said disconnect clutch, and said drag brake are all disengaged.

2. An improvement as in claim 1, wherein said transmission comprises a fluid transmission.

3. An improvement as in claim 1, wherein said vehicle comprises an articulated vehicle and said shaft drivingly communicates with said transmission via universal joint means.

* * * * *